July 2, 1963

G. M. LAHR 3,095,948

MOUNTING AND LUBRICATION SUPPLY MEANS FOR
ENGINE VALVE ACTUATING MECHANISM

Filed Jan. 9, 1961

INVENTOR.
Gilbert M. Lahr
BY
E. E. Jones
ATTORNEY

United States Patent Office

3,095,948
Patented July 2, 1963

3,095,948
MOUNTING AND LUBRICATION SUPPLY MEANS
FOR ENGINE VALVE ACTUATING MECHANISM
Gilbert M. Lahr, Detroit, Mich., assignor to General Motors Corporation, Detroit, Mich., a corporation of Delaware
Filed Jan. 9, 1961, Ser. No. 81,288
5 Claims. (Cl. 184—6)

This invention relates to valve actuating mechanism for internal combustion engines and particularly contemplates an improved mounting and lubrication supply means for valve actuating mechanisms of the overhead valve type.

In relatively high speed engines of the overhead valve type, it has been found essential to provide pressurized lubricant to the pivotal connections of the valve actuating mechanism for requisite component wear durability and reliability and for proper and efficient engine operation. In general, past provisions for such lubricant supply have been relatively complicated and expensive both in component manufacturing and assembly requiring relatively restricted, difficult to align drilled passages in the mounting structures, passages which have not been easily cleaned nor inspected and which have been particularly susceptible to dirt blockage.

The several objectives, advantages and features of the invention will be readily apparent from the following description of a preferred embodiment thereof, having reference to the accompanying sheet of drawings, in which.

Figure 1:
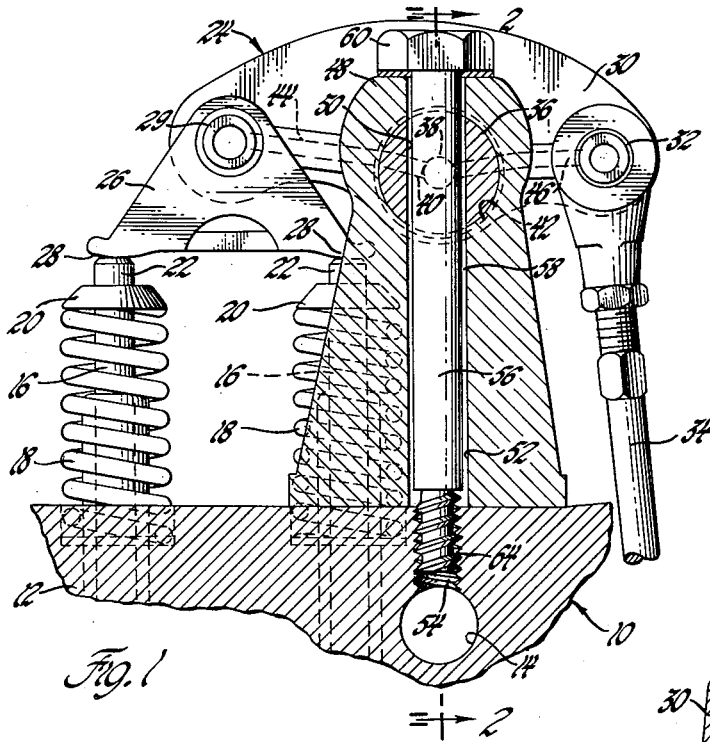
FIGURE 1 is a transverse sectional view of a portion of an internal combustion engine showing the mounting and lubrication supply to a valve actuating mechanism constructed in accordance with the invention.
Figure 2:
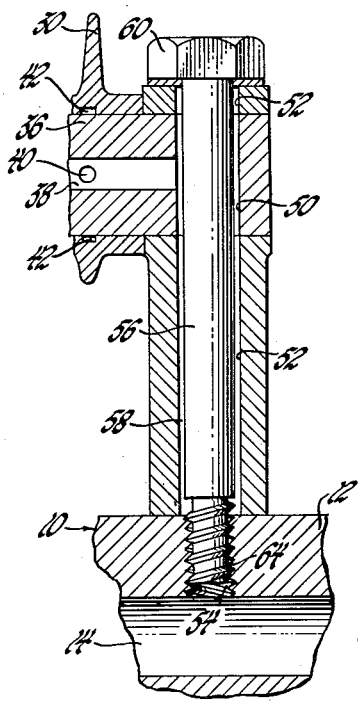
FIGURE 2 is a sectional view taken substantially in the plane of the line and in the direction of the arrows indicated at 2—2 of FIGURE 1.

Referring more particularly to the drawings, portions of an internal combustion engine are indicated generally by the reference numeral 10 and includes a cylinder head 12 having a pressurized lubricant distribution gallery 14 extending longitudinally thereof. Longitudinally spaced and paired inlet or exhaust valves 16 are reciprocably mounted in the cylinder head and are normally biased to their valve closed positions by springs 18 which are compressively interposed between the cylinder head and spring seating washers 20 carried by the upper ends of the valve stems 22. The paired valves are actuated to their opened positions in sequentially phased relation to the operating cycle of their associated combustion chamber by a camshaft timed valve actuating mechanism 24. This valve actuating mechanism is shown and described in greater detail in United States Patent Application Serial No. 854,637, filed November 23, 1959, now Patent No. 3,021,826, in the names of Albert DeFezzy, George P. Hanley, William S. Kenyon and Joseph A. Peak, and entitled, "Rocker Arm and Multiple Valve Actuating Mechanism."

The valve actuating mechanism 24 includes a clevis bridge 26 having spaced pallets 28 thrustably engageable with the upper ends of the valve stems. The clevis portion of the bridge 26 is pivotally connected at 29 to one arm of a rocker arm 30. The distal arm of the rocker arm is pivotally connected at 32 to the upper end of a lash adjusting push rod assembly 34 which is actuated by a suitable cam lobe on the timing camshaft. The several rocker arms 30 for each cylinder combustion chamber are pivotally supported intermediate their ends on a pivot shaft 36 which is in turn supported above the cylinder head by spaced bracket members 48. A drilled passage 38 extends longitudinally of the pivot shaft and is connected to the rocker arm journalling surface thereof by a plurality of spaced lubricant distribution ports 40. The several ports 40 each open to an annular passage defined between the pivot shaft 36 and an undercut groove 42 provided in the journal bearing of its associated rocker arm. These annular passages are intersected by passages 44 and 46 which extend through the rocker arms to their pivot connections at 29 and 32, respectively.

The opposite ends of the pivot shaft 36 are provided with diametrical bolt holes 50 which are alignable with mounting bolt holes 52 extending through the shaft mounting bracket members 48. These bolt holes are alignable with double pitch threaded tapped holes 54 and intersecting the lubricant distribution gallery 14 of the cylinder head. A bracket mounting bolt 56 extends through and is spacedly embraced within each of the several aligned bracket and shaft bolt holes to define cylindrical lubricant supply passages 58 therebetween. Each of the bolts 56 has a wrench receiving head 60 at the upper end thereof and a single pitch threaded portion adjacent the lower, opposite end thereof. In assembly, the bolt head sealingly engages an upper surface provided on the bracket member 48 to close the upper end of the lubricant supply passage 58. The single pitch thread helix of the lower threaded portion of each bolt is separated by a circular helical root land which extends therebetween and is equal to one half the bolt thread pitch. This permits the threaded lower portions of the several bolts to be threaded within the double pitch threads of the corresponding tapped opening 54 in the cylinder head. These mating threads of the bolt and head members serve to secure the mounting brackets and the rocker arm pivot shaft to the cylinder head and provide a relatively smooth helical fluid metering passage 64 interconnecting the rocker shaft and bolt hole defined passages with the lubricant distribution gallery of the cylinder head in insure continuous and sufficient lubrication of the several pivotal surfaces and connections of the shaft and rocker arm assembly.

Figure 3:
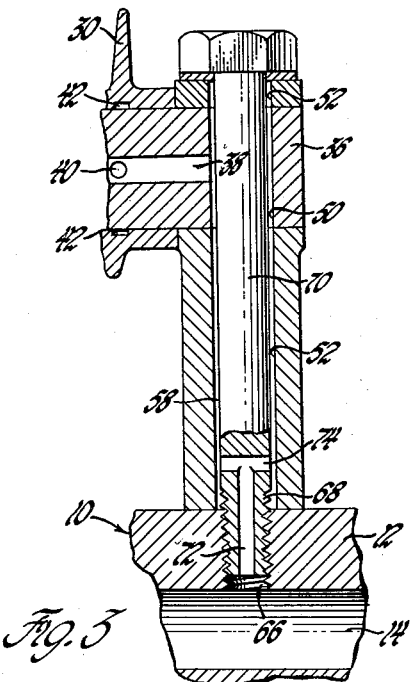
FIGURE 3 is a view similiar to FIGURE 2 showing a previously used mounting and lubrication supply system for such a valve actuating mechanism.

In the previously used pivot shaft mounting and lubrication supply system shown in FIGURE 3, the component features corresponding to those of the illustrative embodiment of the invention are designated by like reference numerals. In this mounting, the cylinder head is provided with a plurality of single pitch threaded holes 66 intersecting the lubricant distribution gallery 14. These threaded holes receive the mating single pitch threaded end portions 68 of the several bracket mounting bolts 70. A drilled passage 72 extends longitudinally of the threaded bolt end portion and intersects a diameterically drilled passage 74 to provide the necessary lubricant supply interconnection between the gallery and the mounting bolt and hole defined clearance passages 58. While eliminating the alignment and machining problems presented by other prior art lubrication supply arrangements, it will be appreciated that the multiple machining and drilling operations required make such drilled bolts both difficult and expensive to manufacture and necessarily require directional flow changes making the fluid connections provided therethrough particularly susceptible to blockage. This is in contrast to the single thread cutting operation required by the bracket mounting bolt of the invention.

While the foregoing description has been limited to one illustrative embodiment of the invention, it will be appreciated that various minor modifications might be made therefrom without departing from the spirit and scope of the invention as defined in the following claims.

I claim:

1. In an internal combustion engine including a cylinder defining member having a lubrication distribution gallery extending therethrough and a plurality of valves reciprocably mounted therein, valve actuating means comprising a plurality of rocker arms operable to actuate said valves to an opened position in sequential phased relation to engine output rotation, a shaft pivotally supporting said rocker arms for pivotal valve actuating movement thereon and having a lubricant distribution passage extending longitudinally therethrough with distribution ports opening to each of the rocker arms mounted thereon, spaced bracket members mounted on said cylinder defining member and supporting said shaft and rocker arms in spaced relation above said cylinder defining member, said shaft and said bracket members having aligned bolt holes therethrough mating with double pitch threaded bolt holes intersecting said lubrication distribution gallery within said cylinder defining member, a bolt extending through and spacedly embraced by each of said bracket bolt holes and the shaft bolt hole aligned therewith to define a lubricant supply passage therebetween, each of said bolts having a head portion at one end thereof sealably abutting an upper surface on said bracket member and having a single pitch threaded portion adjacent the opposite end thereof threadably mating with and secured by the double pitch internal threads of the corresponding threaded opening in the cylinder defining member, said mating internal and external threads defining a helical fluid metering passage therebetween interconnecting the lubrication distribution gallery of said cylinder defining member with each of the lubricant supply passages defined between brackets and their respective mounting bolts.

2. In an internal combustion engine, a cylinder defining member having a lubrication distribution gallery extending therethrough and having a plurality of spaced double pitch threaded holes intersecting said lubrication distribution gallery, a plurality of valve actuating rocker arms, a shaft pivotally supporting said rocker arms and having a lubricant passage extending longitudinally therethrough with distribution ports opening to each of the rocker arms mounted thereon, spaced bracket members supporting said shaft and rocker arms above said cylinder defining member, said shaft and bracket members having aligned bolt holes therethrough, a bolt extending through and spacedly embraced by each of said aligned bracket and shaft bolt holes to define a lubricant supply passage therebetween intersecting said shaft lubricant passage, said bolts each having a head portion at one end sealably engaging said bracket member and having a single pitch spaced threaded portion at the opposite end thereof threadably secured by the double pitch threads of the corresponding threaded bolt hole in the cylinder defining member, said mating threads defining a helical fluid metering passage therebetween interconnecting the lubricant distribution gallery of said cylinder defining member with each of the lubricant supply passages defined between said brackets and their respective mounting bolts.

3. Valve actuating mechanism for an internal combustion engine having a lubrication gallery extending therethrough and having spaced double pitch threaded holes intersecting said gallery, said mechanism including a plurality of valve actuating rocker arms, means including spaced bracket members for pivotally journalling said rocker arms in spaced relation to said engine, said bracket members having bolt holes therethrough, a bolt extending through and spacedly embraced by the bolt hole of each bracket member to define a lubricant supply passage therebetween connected to supply lubricant to the means pivotally journalling said rocker arms, said bolts each sealingly engaging its respective bracket member at one end thereof and having a single pitch threaded portion adjacent its opposite end threadably tightened in the double pitch threads of a corresponding gallery intersecting hole in the engine, said mating threads defining a helical fluid metering passage interconnecting the engine lubricant gallery with said bolt and bracket defined passages.

4. In an internal combustion engine having a lubricant supply gallery extending therethrough and a double pitch threaded hole intersecting said gallery, valve actuating mechanism including a rocker arm, means including a bracket member for pivotally journalling said rocker arm in spaced relation to said engine, said bracket member having a bolt hole and a bolt extending therethrough and defining a passage therebetween connected to supply lubricant to the means pivotally journalling said rocker arm, said bolt having a single pitch threaded end portion threaded in said gallery intersecting hole and securing said bracket member to the engine, said single and double pitch mating threads defining a helical fluid metering passage interconnecting the lubricant supply gallery with said bolt and bracket defined passage.

5. In an internal combustion engine having a lubrication gallery extending therethrough and double pitch threaded holes spacedly intersecting said gallery, valve actuating mechanism including a rocker arm, means including a pivot shaft and two spaced bracket members for pivotally journalling said rocker arms in spaced relation to said engine, said pivot shaft having a lubrication distribution passage extending therethrough and having distribution ports opening to each of the rocker arms mounted thereon, said bracket members each having a bolt hole and a bolt extending therethrough and defining a passage therebetween connected to the distribution passage of said pivot shaft journalling said rocker arms, said bolts each having a single pitch threaded end portion threaded in one of said double pitch threaded gallery intersecting holes and securing its respective bracket member on the engine, said mating threads defining helical fluid metering passages interconnecting the engine lubricant gallery with said bolt and bracket defined passages.

References Cited in the file of this patent

UNITED STATES PATENTS

| | | |
|---|---|---|
| 1,750,293 | Williams | Mar. 11, 1930 |
| 2,288,831 | O'Harrow | July 7, 1942 |